United States Patent
Al-Majed

(10) Patent No.: US 7,412,914 B2
(45) Date of Patent: Aug. 19, 2008

(54) WRITING DEVICE FOR IMPRINTING BRAILLE CHARACTERS

(76) Inventor: Shaikhah A. A. N. A. Al-Majed, Block 6 St. No.: 9 House No.: 30, Al-Adan (KW)

( * ) Notice: Subject to any disclaimer, the term of this patent is extended or adjusted under 35 U.S.C. 154(b) by 70 days.

(21) Appl. No.: 11/360,600

(22) Filed: Feb. 24, 2006

(65) Prior Publication Data
US 2007/0199411 A1    Aug. 30, 2007

(51) Int. Cl.
*B41B 1/00* (2006.01)
*B26F 1/00* (2006.01)

(52) U.S. Cl. .......................... 81/9.2; 30/366

(58) Field of Classification Search ............ 81/9.2, 81/44; 30/366, 367; 33/574; 401/99, 103, 401/109; 606/185, 186; 434/113, 117, 115
See application file for complete search history.

(56) References Cited

U.S. PATENT DOCUMENTS

| | | | | |
|---|---|---|---|---|
| 199,060 A | * | 1/1878 | Giutmann | 30/367 |
| 2,602,360 A | * | 7/1952 | Berninger | 30/367 |
| 2,622,561 A | * | 12/1952 | Baker | 401/110 |
| 3,382,577 A | * | 5/1968 | Rieder | 30/366 |
| 4,316,326 A | * | 2/1982 | Yeaton et al. | 30/366 |
| 6,684,514 B2 | * | 2/2004 | Welch | 30/367 |
| 2007/0107237 A1 | * | 5/2007 | Long | 30/360 |

* cited by examiner

*Primary Examiner*—Hadi Shakeri
(74) *Attorney, Agent, or Firm*—Lowe Hauptman Ham & Berner, LLP

(57) ABSTRACT

A writing device for imprinting Braille characters on an underlined sheet of paper includes an outer barrel and a spring biased receptacle stylus together with a spring biased activating member at an opposite end of the barrel. The stylus includes a rear portion and a forward portion of reduced diameter and a point. A forward member is threadedly attached to the barrel and includes a rearward facing shoulder. A first spring is disposed around the forward portion of the stylus, against a shoulder formed by the reduced diameter of the forward portion and the rearward facing shoulder on the forward member. A second spring is disposed at a opposite end of the barrel between a forward facing shoulder on the activating member and a base portion of the barrel for moving the stylus out of said barrel to form a portion of a Braille character.

11 Claims, 1 Drawing Sheet

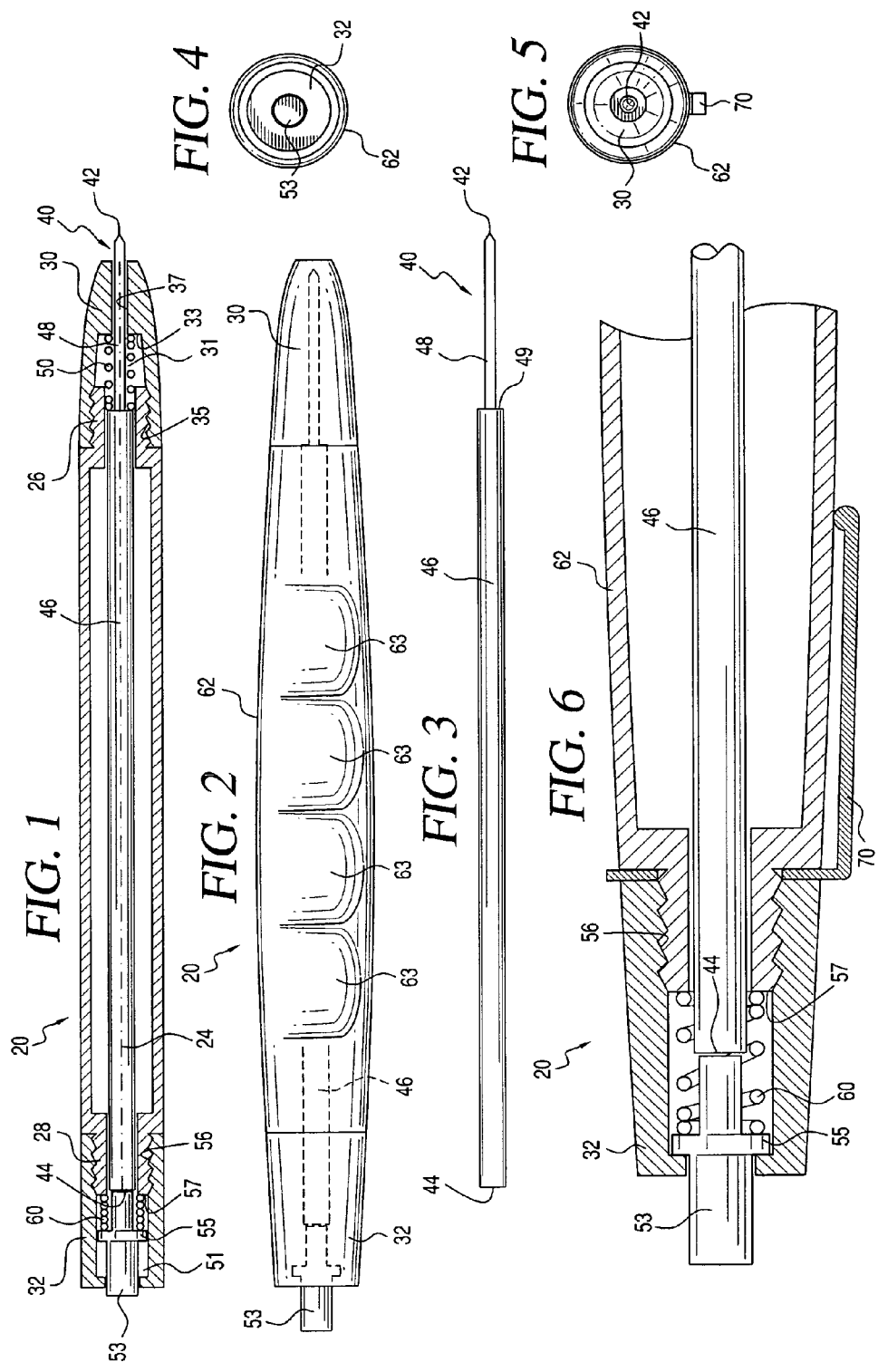

WRITING DEVICE FOR IMPRINTING BRAILLE CHARACTERS

FIELD OF THE INVENTION

This invention relates to a writing device for imprinting Braille characters and more particularly to a hand held stylus for forming Braille impressions on paper.

BACKGROUND FOR THE INVENTION

Braille is a system for writing for the visually impaired by using characters formed of six-dot arrays. The arrays include two adjacent columns with three dots in each column so that each dot of one column is horizontally aligned with an associated dot in the other column. Selecting various combinations for the dots forms the characters. For example, the letter "a" is characterized by a single raised dot in the first or upper most row of the left hand column. The letter "c" consists of a raised dot in each first row of the two columns.

Styluses for writing Braille are known. For example, a U.S. Patent of Yeaton et al. discloses a stylus for writing Braille that includes a longitudinally extending handle, an arm attached to the handle with an angular offset pointed end for making Braille impressions in paper. A pressure pad is attached to the arm for supporting a user's finger. Also, the handle is specially configured to locate the user's hand to a uniform gripping position during use of the stylus while the pad acts in conjunction with the user's index finger for applying downward pressure on the pointed end of the stylus.

While styluses of the aforementioned design may permit a user to form accurately aligned Braille characters, they include an angularly offset pointed end. Thus, such styluses are not conveniently carried in a pocket or protected by recessing the point into a guard.

Instruments with retractable points are also well known. For example, a U.S. Pat. of Burton, No. 4,665,912 discloses a skin-marking device comprising a finger-held tubular barrel having a narrow opening at one end and a needle carried in the barrel. The needle includes a pointed end extending outwardly through the narrow barrel opening and may be axially moved between an extended and recessed position.

It is now believed that there is a need and may be a commercial market for a writing device in accordance with the present invention. There should be a demand because the writing devices in accordance with the present invention are of a convenient size and easy to carry by clipping to a user's shirt or jacket pocket. Such devices also store a sharp point in a recessed position to avoid inadvertent scratches or punctures in the user's skin or tears in an individual's clothes. Further, such devices are of a convenient size to suit various individual users ranging from relatively small children to relatively large adults, are light in weight, durable and easy to use. The devices disclosed herein can also be manufactured and sold at a relatively low cost, are convenient and painless to use and can be produced in different sizes and shapes to appeal to the preferences and comfort of various individuals. Further such devices can be used over relatively long periods of time without unduly tiring the hand of the user.

BRIEF SUMMARY OF THE INVENTION

In essence, the present invention contemplates a writing device for imprinting Braille characters. The writing device includes a hollow elongated barrel having a cylindrical passageway with a central axis extending through the barrel. The elongated barrel includes a front portion and a rear portion and is threaded on each end thereof. The writing device also includes a one-piece elongated stylus having a point at one end and a generally flat transverse surface at an opposite end thereof. The stylus is disposed in the passageway and in sliding contact therewith. The stylus includes a first rear portion and a second forward portion of reduced diameter rearwardly of the point and forming a forward facing shoulder between the first rear portion and the second forward portion of the stylus.

In a preferred embodiment of the invention, the cylindrical passageway is constructed and dimensioned to receive the stylus therein with its first rear portion in sliding contact with the cylindrical passageway. The device also includes a hollow elongated front member having a cylindrical passageway, axially aligned with the central axis extending through the front member. The front member also defines a rearwardly facing shoulder and is threaded onto a forward portion of the barrel.

A coil spring is disposed around the second forward portion of the stylus between the forward facing shoulder on the stylus and the rearwardly facing shoulder in the front member. The spring biases the stylus toward and into a retracted position wherein the point of the stylus is covered by the front member. In practice, the stylus is retracted into the point and is slightly above the opening. For example, a retraction of about 1/16 inch to about 1/8 of an inch from the opening is preferred.

A rear member at the back of the device includes a generally cylindrical passageway that is axially aligned with the central axis and with the passageway in the forward member. The rear member is threaded onto the hollow elongated barrel. A cylindrical activating member or pushbutton includes a radially and outwardly extending flange extending outwardly from the surface of the actuating member and forming a forward facing shoulder.

A second spring is disposed around the forward portion of the activating member and between the forwardly facing shoulder on the activating member and a base formed in the opposite end of the elongated barrel and surrounding the cylindrical passageway. This second spring biases the activating member away from the base at the opposite end of the barrel into a "recessed" position wherein the stylus is in a fully retracted position.

The invention will now be described in connection with accompanying drawings wherein like reference numbers have been used to identify like parts.

DESCRIPTION OF THE DRAWINGS

FIG. 1 is a side cross sectional view of a writing device in accordance with one embodiment of the present invention shown with a retractable stylus in an extended position;

FIG. 2 is side elevational view of a writing device in accordance with a second embodiment of the invention shown with a retractable stylus;

FIG. 3 is side elevational view of a stylus in accordance with the present invention;

FIG. 4 is a front view of a writing device in accordance with the invention;

FIG. 5 is a rear view of a writing device in accordance with a third embodiment of the invention; and FIG. 6 is a cross sectional view of a writing device in accordance with the third embodiment of the invention.

DESCRIPTION OF THE PREFERRED EMBODIMENTS OF THE INVENTION

As illustrated in FIG. 1, a writing device 20 for imprinting Braille characters on a paper base includes a hollow elongated barrel 22 having a cylindrical passageway 23 with a central axis 24 extending through the barrel 22. The barrel 22 includes a front portion 26 and rear portion 28. The front portion 26 and rear portion 28 are threaded for receiving a front member 30 and rear member 32.

The writing device 20 also includes a one-piece elongated stylus 40 (shown more clearly in FIG. 3) which is preferably made of metal such as stainless steel or other suitable metal which may be chrome plated. The stylus 40 has a point 42 at one end thereof and a relatively flat transverse surface 44 at an opposite end thereof. The stylus 40 also includes a first rear portion 46 and a second forward portion 48 of reduced diameter covering about 20% of the distance from the front of the stylus to the back of the stylus. The reduced diameter of the forward portion 48 forms a forward facing shoulder 49 (FIG. 3). In a preferred embodiment of the invention, the stylus has a length of about 95.5 mm and the second forward portion has a length of about 20.5 mm. The thickness or diameter of the rear portion is about 5.4 mm while the forward portion has a thickness or diameter of about 2.5 mm.

In the preferred embodiment of the invention the cylindrical passageway 23 is constructed and dimensioned to receive the stylus 40 therein with the first rear portion 46 in sliding contact with the cylindrical passageway. The tolerances are preferable relatively close in order to provide a smooth sliding contact without lateral movement. The writing device 20 also includes the front member 30 having a cylindrical passageway 31 axially aligned with the central axis 24 extending through the front member 30. The front member 30 also defines a rearward facing shoulder 33 and a threaded portion 35 for attachment to the front portion 26 of the barrel 22. In addition, the front member 30 also includes a constricted area or guide portion 37 at a front portion of the front member 30. The guide portion 37 is constructed and dimensioned to provide sliding contact between the front portion 48 of the stylus 40 and the guide portion 37.

A coil spring 50 is disposed around the second forward portion 48 of the stylus 40 and between the forward facing shoulder 49 in the stylus 40 and rearwardly facing shoulder 33 in the front member 30. The spring 50 biases the stylus toward the rear and into a retracted position wherein the point 42 of the stylus 40 is recessed into the passageway 31 of the front member 33. In a preferred form, the stylus is retracted into the front member 30 and its point is recessed by about 1/16 inch to about 1/8 inch. The point is recessed sufficiently so that if the device is pressed against an individual's skin and moved the point 42 will not scratch or puncture the skin. Further the slight recess allows forward movement of the stylus to move with a slight pressure from a user's thumb and to accelerate before striking a writing surface.

The writing device 20 also includes rear member 32 which is threaded onto the rear portion 28 of the barrel 22. The rear portion 32 also includes a generally cylindrical passage 51 that is axially aligned with the central axis 24 and surrounds an activating member or button 53. The button 53 includes a radially and outwardly extending flange 55 extending outwardly from the surface of the button 53.

The rear portion 28 of the barrel 22 includes a threaded end 56 and a relatively flat base 57 with a passageway passing therethrough. An elongated activating member 53 extends into an abutting relationship with the end 44 of the stylus 40. The activating member 53 is then used to force the stylus 40 in a forward direction against the spring 50 to force the point 42 out of its recessed position and into an underlying sheet of paper.

A second spring 60 is disposed around a forward portion of the activating member 53 between the forward facing shoulder on the activating member 53 and the base 57 for biasing the activating member in a direction away from the stylus 40 to allow the point 42 to move into the forward member 30 and into a recessed position.

The use of two relatively light springs 50 and 60 for recessing the stylus is preferable to the use of a single spring in the forward part of the device. The use of the two springs 50 and 60 divides the forces between the rear facing shoulder in the front member and the base at the rear of the barrel 23. This allows lighter materials and thinner walls in the forward member 30 and in the barrel 22. Further, if a single spring breaks, the second spring will have enough strength to recess the point into the forward member 30.

The barrel 62 of a writing device 20 in accordance with a second embodiment of the invention is illustrated in FIGS. 2 and 4. As shown, the second embodiment of the invention is generally similar to the first embodiment and operates in the same manner. However, the barrel 62 has a slightly convex shape obtainable by rotating a curve about the central axis 24. The surface of the barrel 62 may also include four indentations 63 for finger placement when the device 20 is held in the hand of the user. For example, in the use of the device 20, a user holds the barrel between the forefinger and the portion of the palm adjacent to the fingers and/or the portion of the fingers adjacent to the palm. In essence the user wraps their fingers around the barrel with the thumb on the activating member 53.

A third embodiment of the invention shown in FIG. 6 is also generally similar to the first and second embodiments. However, the third embodiment of the invention includes a pocket clip 70 which slips over the rear portion 28 of the barrel 22 and is clamped in place when the rear member is screwed onto the rear portion 28 to thereby clamp the pocket clip in place in a conventional manner.

While the invention has been described in connection with its preferred embodiments, it should be recognized and understood that changes and modifications may be made therein without departing from the scope of the appended claims.

What is claimed is:

1. A writing device for imprinting Braille characters comprising:
    a hollow elongated barrel having a first end and an opposite end threaded at each end thereof and having a cylindrical passageway with a central axis extending therethrough;
    a one piece elongated stylus having a point at one end and a generally flat transverse surface at an opposite end thereof disposed in said passageway, said stylus having a first rear portion and a second forward portion of reduced diameter rearwardly of said point and forming a forward facing shoulder between said first rear portion and said second forward portion;
    said cylindrical passageway constructed and dimensioned to receive said stylus with a first portion in sliding contact therewith;
    a hollow elongated front member including a cylindrical passageway axially aligned with said central axis of said hollow barrel extending therethrough and a rearward facing shoulder, threaded onto a front portion of said hollow elongated barrel;
    a coil spring disposed around said second forward portion of said stylus between said forward facing shoulder of said stylus and said rearward facing shoulder in said front member for biasing said styluses into a recessed portion with said point encompassed in said front member;

a rear member including a generally cylindrical hollow passageway axially aligned with said central axis extending through said rear member threaded onto a rear portion of said barrel;

an activating member including a radially and outwardly extending flange extending outwardly from the outer surface of said cylindrical activating member and forming a forwardly facing shoulder;

a base formed on said opposite end of said elongated barrel surrounding said cylindrical passageway; and a second spring disposed around a forward portion of said activating member and between said forwardly facing shoulder on said activating member and said base for biasing said activating member away from said opposite end of said barrel in a direction away from said point of said stylus allowing said stylus to be fully retracted with said point surrounded by said forward member.

2. A writing device for imprinting Braille characters according to claim 1 in which said barrel is threaded at both ends with threads on an outer surface thereof and wherein said threads in said forward member and said rear member are on inner-surfaces thereof.

3. A writing device for imprinting Braille characters according to claim 2 which includes a pocket clip clamped in place by said rear member.

4. A writing device for imprinting Braille characters according to claim 3 in which a forward portion of said hollow elongated front member includes a portion of reduced diameter and wherein said forward portion of said stylus is in sliding contact with said portion of said reduced diameter.

5. A writing device for imprinting Braille characters according to claim 4 in which said forward member includes a tapered outer surface.

6. A writing device for imprinting Braille characters according to claim 5 in which said outer surface of said elongated barrel, said front member and said rear member provide an uninterrupted smooth surface.

7. A writing device for imprinting Braille characters according to claim 6 in which said elongated barrel defines a convex surface.

8. A writing device for imprinting Braille characters according to claim 7 which includes a plurality of concave portions for finger placement.

9. A writing device for imprinting Braille characters according to claim 8 in which said barrel has a convex arc shaped surface along its longitudinal axis.

10. A writing device for imprinting Braille characters according to claim 9 in which said barrel includes a plurality of indentations for finger placement.

11. A writing device for imprinting Braille characters according to claim 1 in which said barrel is threaded at both ends thereof with threads on an inner surface thereof and wherein said forward member and said rear member are threaded on an outer surface thereof.

* * * * *